US 6,574,907 B1

(12) United States Patent
Mitton

(10) Patent No.: US 6,574,907 B1
(45) Date of Patent: Jun. 10, 2003

(54) RETRACTABLE HOOKING MECHANISM FOR FISHING LURES AND THE LIKE

(76) Inventor: David V. Mitton, 4827 Thunderbird Dr. #91, Boulder, CO (US) 80303

( * ) Notice: Subject to any disclaimer, the term of this patent is extended or adjusted under 35 U.S.C. 154(b) by 0 days.

(21) Appl. No.: 10/038,129

(22) Filed: Jan. 3, 2002

(51) Int. Cl.[7] .................. A01K 83/02; A01K 85/02
(52) U.S. Cl. .................. 43/35; 43/37; 43/42.09
(58) Field of Search .................. 43/34–37, 42.09

(56) References Cited

U.S. PATENT DOCUMENTS

| | | | | |
|---|---|---|---|---|
| 906,519 A | * | 12/1908 | Fischer | 43/35 |
| 1,021,699 A | * | 3/1912 | Nordlund | 43/35 |
| 1,173,694 A | * | 2/1916 | Witty | 43/35 |
| 1,588,690 A | * | 6/1926 | Babbitt | 43/35 |
| 1,638,923 A | * | 8/1927 | Danielson | 43/35 |
| 1,670,174 A | * | 5/1928 | Wiersma | 43/35 |
| 1,694,697 A | | 12/1928 | Beidatsch | 43/35 |
| 1,890,266 A | | 12/1932 | Schadell et al. | 43/35 |
| 1,994,878 A | | 3/1935 | Smith et al. | 43/35 |
| 2,205,773 A | * | 6/1940 | Fox | 43/35 |
| 2,614,356 A | | 10/1952 | Kayes, Jr. | 43/35 |
| 2,618,096 A | * | 11/1952 | Wagner | 43/42.09 |
| 2,764,834 A | * | 10/1956 | Klein | 43/42.09 |
| 2,794,286 A | * | 6/1957 | Albach | 43/35 |
| 2,972,830 A | * | 2/1961 | Sarnow | 43/35 |
| 3,060,619 A | * | 10/1962 | Cornick | 43/35 |
| 3,081,572 A | * | 3/1963 | Tomsello | 43/35 |
| 3,091,883 A | * | 6/1963 | Hufford | 43/42.09 |
| 3,169,337 A | * | 2/1965 | McGregor | 43/42.09 |
| 3,411,233 A | | 11/1968 | Hopper | 43/35 |
| 3,665,634 A | | 5/1972 | Baud | 43/35 |
| 3,739,517 A | * | 6/1973 | Schleif | 43/35 |
| 3,849,928 A | * | 11/1974 | Collins, Sr. | 43/37 |
| 3,913,257 A | * | 10/1975 | Colgan | 43/42.09 |
| 4,337,591 A | * | 7/1982 | Gell et al. | 43/42.09 |
| 4,782,618 A | | 11/1988 | Rainey | 43/35 |
| 5,010,679 A | * | 4/1991 | Tischer | 43/35 |
| 6,308,453 B1 | * | 10/2001 | Meyer | 43/37 |

FOREIGN PATENT DOCUMENTS

| | | | | |
|---|---|---|---|---|
| CA | 481153 B1 | * | 2/1952 | 43/35 |
| GB | 4146 B1 | * | of 1881 | 43/35 |
| JP | 10-248442 B1 | * | 9/1998 | |
| WO | WO-00/25579 A1 | * | 5/2000 | |

* cited by examiner

Primary Examiner—Darren W. Ark
(74) Attorney, Agent, or Firm—Emery L. Tracy

(57) ABSTRACT

A retractable hooking mechanism for fishing lures and the like for use in catching fish and the like during fishing activities is provided. The retractable hooking mechanism comprises a first plate having a first surface and a second surface and a second plate having a first surface and a second surface with the second plate being spaced from the first plate creating a receiving area therebetween. A first hook is pivotally secured within the receiving area between the first plate and the second plate. The first hook is moveable from a retracted position between the first plate and the second plate to an extended position wherein at least a portion of the hook extends from between the first plate and the second plate. A friction mechanism contacts the first hook for releasably maintaining the first hook in the retracted position wherein upon the occurrence of a predetermined event, the first hook moves to the extended position.

4 Claims, 4 Drawing Sheets

RETRACTABLE HOOKING MECHANISM FOR FISHING LURES AND THE LIKE

BACKGROUND OF THE INVENTION

1. Field of the Invention

This invention relates generally to a retractable hooking mechanism for fishing lures and the like and, more particularly, it relates to a retractable hooking mechanism for fishing lures and the like which is normally retracted thereby inhibiting entanglement with weeds and other fishing hazards and extends from the fishing lure upon a fish strike to hook the fish.

2. Description of the Prior Art

Fishing lures are commonly used during fishing activities to catch fish. In the past, fishing lures of the artificial bait or plug types have improved the ability to catch fish during trolling or spin casting. These types of fishing lures generally have a body portion that floats, bobs, sinks, or otherwise is pulled through the water and has hooks suspended therefrom. The majority of such fishing lures resemble or at least simulate smaller fish which serve as a food source for the larger carnivorous fish intended to be caught, and most of such lures are provided with external hooks in single, double, or treble configurations for engaging the fish when the latter strikes or swallows the lure, even partially.

Due to the preferred environment of many fish species, fishing is preferable in and around areas that have weeds, logs, rocks, and the like through which the hooks, extending from the lure, pass and sometimes engage. When the exterior hooks engage these hazards, entanglement often occurs which, in many cases, causes the fisherperson to lose his or her fishing lure or lose valuable fishing time in cleaning the lure of the weeds or the like. Even more importantly, interference with the open-mouthed envelopment of the fishing lure or at least the major portion thereof by the fish can occur.

Accordingly, there exists a need for a retractable hooking mechanism for fishing lures and the like which is normally retracted during ordinary fishing activities to inhibit entanglement of the hooking mechanism with weeds or other underwater obstacles. Additionally, a need exists for a retractable hooking mechanism for fishing lures and the like which extends from the fishing lure upon the occurrence of a predetermined event such as a fish striking the fishing lure. Furthermore, there exists a need for a retractable hooking mechanism for fishing lures and the like which is releasably secured in the retracted position by friction with the amount of friction being adjustable to inhibit premature release of the retractable hooking mechanism from the fishing lure.

SUMMARY

The present invention is a retractable hooking mechanism for fishing lures and the like for use in catching fish and the like during fishing activities. The retractable hooking mechanism comprises a first plate having a first surface and a second surface and a second plate having a first surface and a second surface with the second plate being spaced from the first plate creating a receiving area therebetween. A first hook is pivotally secured within the receiving area between the first plate and the second plate. The first hook is moveable from a retracted position between the first plate and the second plate to an extended position wherein at least a portion of the hook extends from between the first plate and the second plate. A friction mechanism contacts the first hook for releasably maintaining the first hook in the retracted position wherein upon the occurrence of a predetermined event, the first hook moves to the extended position.

In addition, the present invention includes a retractable hook device for a fish lure. The retractable hook device comprises at least one hook mechanism moveable from a retracted position to an extended position and friction means for releasably maintaining the hook mechanism in the retracted position.

The present invention further includes a method for constructing a retractable hooking mechanism. The method comprises spacing a first plate relative to a second plate, pivotally securing a hook device between the first plate and the second plate in a retracted position, releasably maintaining the hook device in the retracted position, and pivoting the hook device into an extended position wherein at least a portion of the hook device extends from between the first plate and the second plate.

DETAILED DESCRIPTION OF THE PREFERRED EMBODIMENTS

Figure 1:
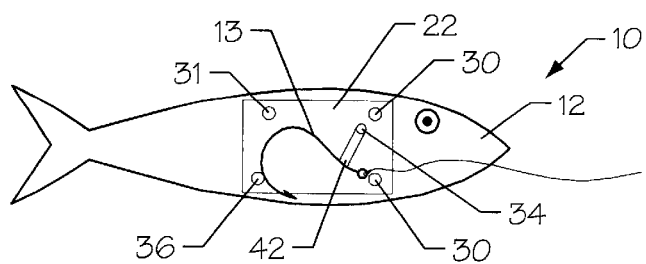
FIG. 1 is an elevational side view illustrating a retractable hooking mechanism for fishing lures and the like, constructed in accordance with the present invention, with the retractable hooking mechanism being shown in the retracted position secured within an artificial minnow.
Figure 2:
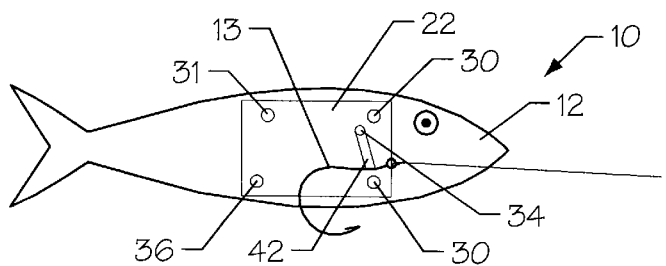
FIG. 2 is an elevational side view illustrating the retractable hooking mechanism of FIG. 1, constructed in accordance with the present invention, with the retractable hooking mechanism being shown in the extended position secured within an artificial minnow.

As illustrated in FIGS. 1 and 2, the present invention is a retractable hooking mechanism, indicated generally at 10, for fishing lures 12 and the like with the retractable hooking mechanism 10 moveable from a retracted position (FIG. 1) to inhibit entanglement with underwater obstacles into an extended position (FIG. 2) for hooking a fish. The retractable hooking mechanism 10 of the present invention can be used alone as a stand-alone fishing lure or in conjunction with an existing off-the-shelf fishing lure such as an artificial minnow or the like. The retractable hooking mechanism 10 is sized, shaped, and adapted to be inserted into the minnow and secured therein without further adaptation of the minnow. Actual construction and use of the retractable hooking mechanism 10 will be described in further detail below.

Figure 3:
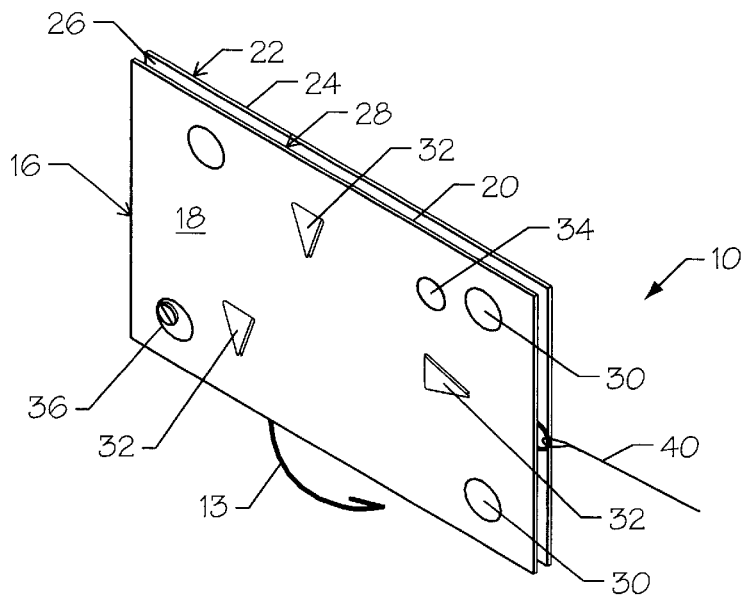
FIG. 3 is a perspective view illustrating the retractable hooking mechanism, constructed in accordance with the present invention, with the hooking mechanism being shown in the extended position.
Figure 4:
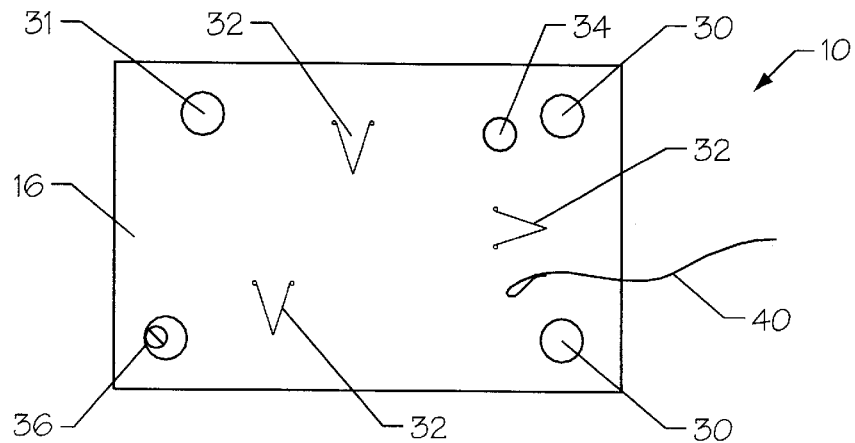
FIG. 4 is an elevational side view illustrating the retractable hooking mechanism, constructed in accordance with the present invention, with the hooking mechanism being shown in the retracted position.

As illustrated in FIGS. 3 and 4, the retractable hooking mechanism 10 of the present invention includes a first plate 16 having an outer surface 18 and an inner surface 20 and a second plate 22 having an outer surface 24 and an inner surface 26. Preferably, the first plate 16 and the second plate 22 are constructed from a metal material. It is within the scope of the present invention, however, to construct the first plate 16 and the second plate 22 from different materials including, but not limited to, sheet metal, Fiberglas, plastic, ceramic, wood, etc. Furthermore, the first plate 16 and the second plate 22 can be constructed from different materials from each other or the same material.

The first plate 16 and the second plate 22 are positioned in spaced relation to each other thereby forming a hook receiving area 28 between the inner surface 20 of the first plate 16 and the inner surface 26 of the second plate 22. Furthermore, the first plate 16 and the second plate 22 are held together in this spaced relation by at least on fastening mechanism 30. The fastening mechanism 30 can be any type of fastening mechanism including, but not limited to, a rivet, screw, bolt, etc.

Figure 14:
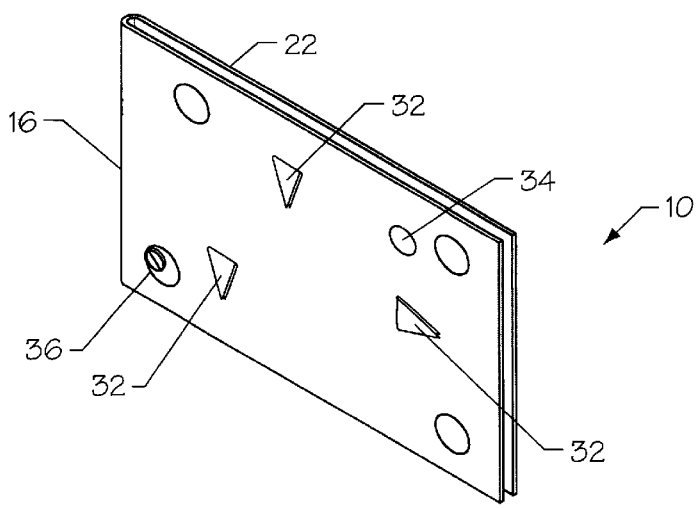
FIG. 14 is a perspective view illustrating yet another embodiment of the retractable hooking mechanism, constructed in accordance with the present invention.

As illustrated in FIG. 14, another embodiment of the retractable hooking mechanism 10 of the present invention is shown. Instead of a separate first plate 16 and second plate 22 being in secured spaced relation, the retractable hooking mechanism 10 of the present invention can have a single plate which is folded over to form the first plate 16 and the second plate 22 with the hook receiving area 28 therebetween. All other aspects of the retractable hooking mechanism 10 of the present invention remain similar.

The outer surface 18 of the first plate 16 and/or the outer surface 24 of the second plate 22 of the retractable hooking mechanism 10 can have at least one self-anchoring device 32 for securing the retractable hooking mechanism 10 within the artificial minnow or the like. In a preferred embodiment, the self-anchoring device 32 is a punched area extending away from the outer surfaces 18, 24 of the first plate 16 and the second plate 22, respectively. The self-anchoring device 32 can also include an anchor (not shown) welded or otherwise connected to the outer surface 18 of the first plate 16 and/or the outer surface 24 of the second plate 22.

Figure 5:
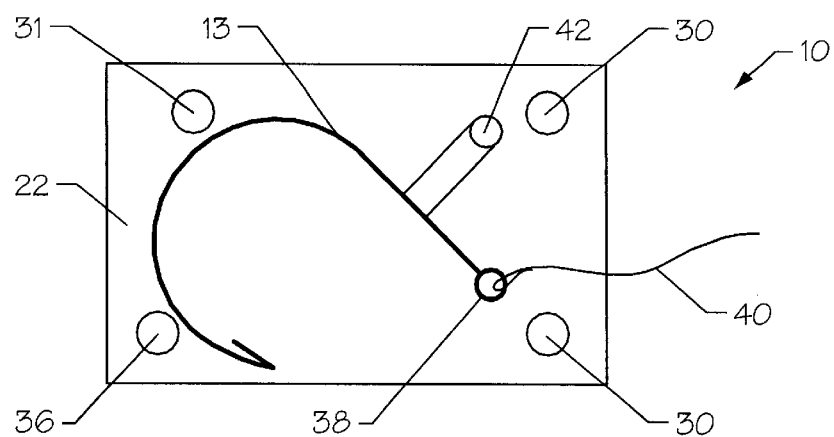
FIG. 5 is an elevational side view illustrating the retractable hooking mechanism, constructed in accordance with the present invention.

As illustrated in FIG. 5, the retractable hooking mechanism 10 of the present invention includes at least one hook 13 and maintains each hook 13 in a retracted position until the occurrence of a predetermined event in which the hooks 13 are moved into the extended position. In a typical situation, the predetermined event is the striking of the retractable hooking mechanism 10 by a fish or the like. As the fish strikes the fishing lure 12 enclosing the retractable hooking mechanism 10, the drag between the striking fish and the fisherperson causes at least a portion of the hooks 13 of the retractable hooking mechanism 10 to extend from the retractable hooking mechanism 10 (See FIG. 6). The retractable hooking mechanism 10 is then secured within the mouth of the fish thereby hooking the fish for catch by the fisherperson.

The hooks 13 of the retractable hooking mechanism 10 are secured within the hook receiving area 28 on a pivot point 34. The hooks 13 pivot about the pivot point 34 from the retracted position to the extended position.

Figure 6:
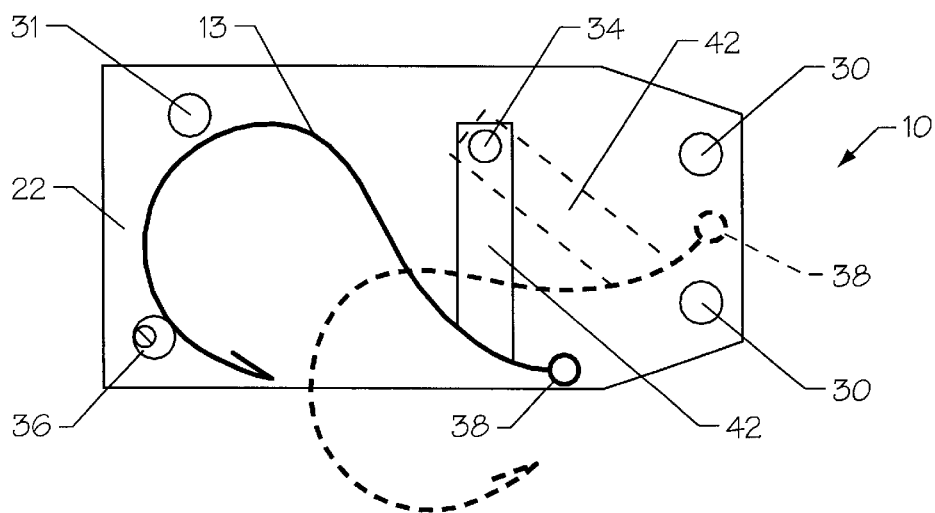
FIG. 6 is an elevational side view illustrating another embodiment of the retractable hooking mechanism, constructed in accordance with the present invention.

Still referring to FIGS. 5 and 6, in addition to the fastening mechanisms 30 maintaining the first plate 16 and the second plate 22 in a spaced relation to each other, at least one of the fastening mechanisms 36 serves to releasably maintain the hooks 13 within the hook receiving area 28 of the retractable hooking mechanism 10. The hook-maintaining fastener 36 can be a pre-set friction shaft substantially identical to the remaining fastening mechanisms 30 (FIG. 5). In this instance, the friction between the hook-maintaining fastener 36 and the hooks 13 is a predetermined friction which is set by the manufacturer of the retractable hooking mechanism 10 depending on the intended fishing environment and/or fish type. Another fastening mechanism 31 can be used to limit the opposite rotation of the hook 13.

In another embodiment the hook-maintaining fastener 36 can be an adjustable offset cam which adjusts the friction between the hook-maintaining fastener 36 and the hooks 13 (FIG. 6). By rotating the offset cam, the amount of friction between the hook-maintaining fastener 36 and the hooks 13 can be varied and adjusted. The hook-maintaining fastener 36 can be adjusted by the fisherperson at the fishing site depending on the fishing environment and/or the fish type.

Figure 7:
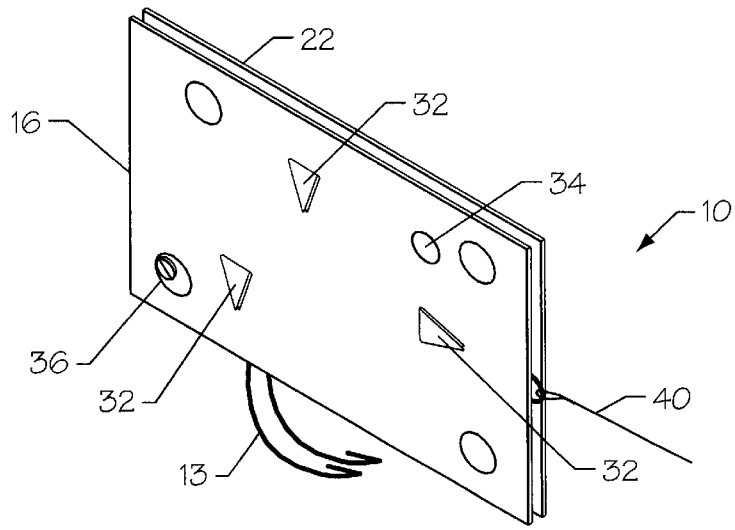
FIG. 7 is a perspective view illustrating still another embodiment of the retractable hooking mechanism, constructed in accordance with the present invention, with the retractable hooking mechanism having a double hook configuration.
Figure 8A:
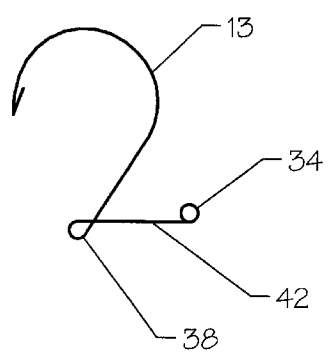
FIGS. 8a, 8b, and 8c are elevational side views illustrating an embodiment of the retractable hooking mechanism, constructed in accordance with the present invention, with the retractable hooking mechanism having a variety of single hook configurations.
Figure 8B:
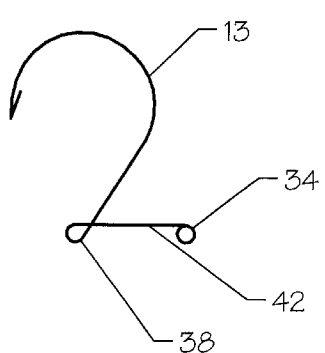
Figure 8C:
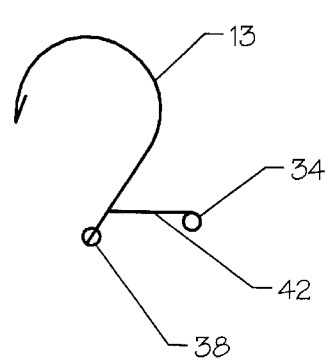
Figure 9A:
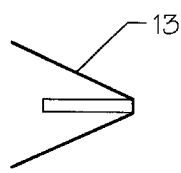
FIG. 9a is a top plan view illustrating another embodiment of the retractable hooking mechanism, constructed in accordance with the present invention, with the retractable hooking mechanism having a double hook configuration.
Figure 9B:
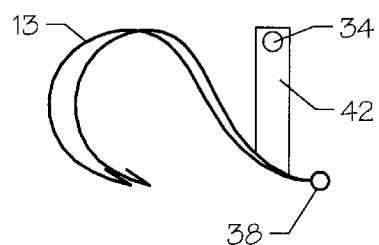
FIG. 9b is an elevational side view illustrating the retractable hooking mechanism of FIG. 9a, constructed in accordance with the present invention.
Figure 10:
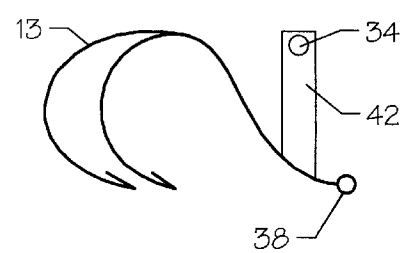
FIG. 10 is an elevational side view illustrating still another embodiment of the retractable hooking mechanism, constructed in accordance with the present invention, with the retractable hooking mechanism having another double hook configuration.
Figure 11A:
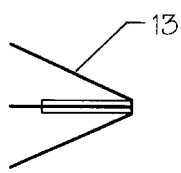
FIG. 11a is a top plan view illustrating yet another embodiment of the retractable hooking mechanism, constructed in accordance with the present invention, with the retractable hooking mechanism having a treble hook configuration.
Figure 11B:
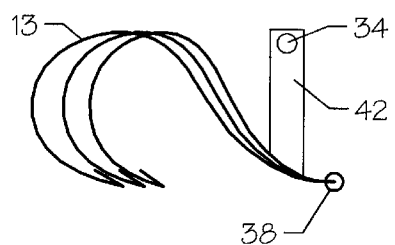
FIG. 11b is an elevational side view illustrating the retractable hooking mechanism of FIG. 11a, constructed in accordance with the present invention.
Figure 12:
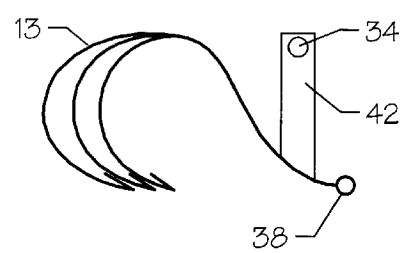
FIG. 12 is an elevational side view illustrating still yet another embodiment of the retractable hooking mechanism, constructed in accordance with the present invention, with the retractable hooking mechanism having another treble hook configuration.
Figure 13:
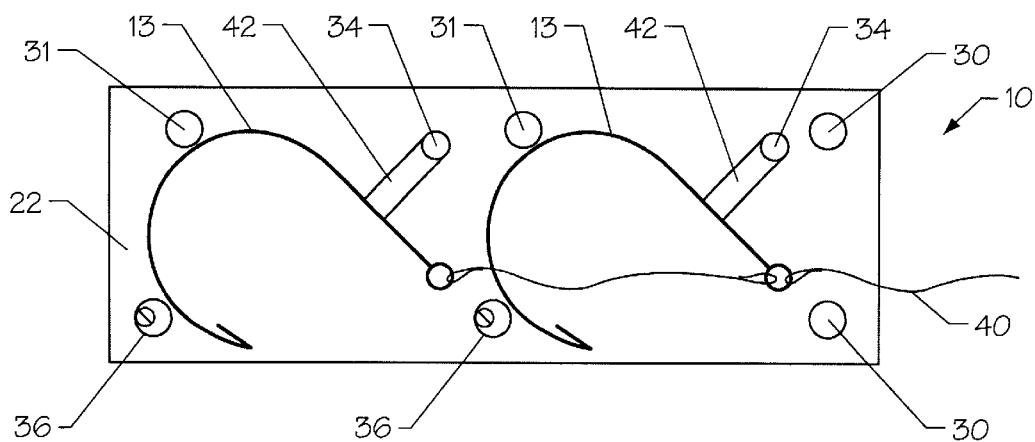
FIG. 13 is an elevational side view illustrating yet another embodiment of the retractable hooking mechanism, constructed in accordance with the present invention, with a pair of retractable hooking mechanisms being positioned in a tandem configuration.

As illustrated in FIGS. 7–13, the retractable hooking mechanism 10 of the present invention can accommodate a wide variety of hooks 13. FIG. 7 illustrates a preferred embodiment of the present invention with a double hook 13 configuration in the extended position from the retractable hooking mechanism 10. FIGS. 8a, 8b, and 8c illustrate various single hook 13 configurations for use with the retractable hooking mechanism 10 of the present invention. FIGS. 9a, 9b, and 10 illustrate various double hook 13 configurations for use with the retractable hooking mechanism 10. FIGS. 11a, 11b, and 12 illustrate various treble hook 13 configurations for use with the retractable hooking mechanism 10. FIG. 13 illustrates another configuration of the double hook 13 configurations with the double hook 13 being positioned in tandem in the retracted position. It should be noted that additional hooks 13 can be positioned, similar to FIG. 13, to have triple hooks 13 or more.

Each of the hooks 13 of each of the embodiments of the retractable hooking mechanism 10 includes a loop 38 for attaching a fishing line 40 (see FIGS. 5 and 13). For some embodiments, the retractable hooking mechanism 10 includes an extension arm 42 extending from the pivot point 34 to the hook 13. The extension arm 42 is attached to the hooks 13 by welds or the like.

Figure 15:
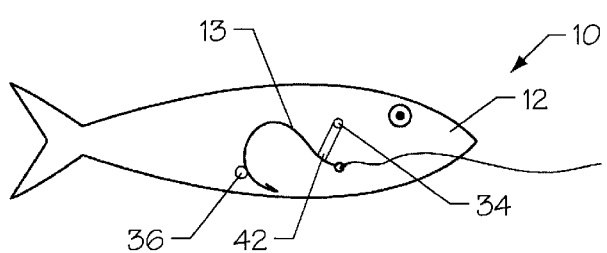
FIG. 15 is an elevational side view illustrating still yet another embodiment of the retractable hooking mechanism, constructed in accordance with the present invention.

As illustrated in FIG. 15, the retractable hooking mechanism 10 of the present invention can include the hook 13, the pivot point 30, the fastening mechanism 31, and the hook-maintaining fastener 36 without the first plate 16 and the second plate 22. In this embodiment, the retractable hooking mechanism 10 can be incorporated directly into the fishing lure 12.

During fishing activities, the fisherperson positions the hooks 13 of the retractable hooking mechanism 10 in the retracted position within the hook receiving area 28 of the retractable hooking mechanism 10. The hooks 13 of the retractable hooking mechanism 10 is held in the retracted position by the hook-maintaining fastener 36. If the hook-maintaining fastener 36 is the adjustable offset cam, the fisherperson can then rotate the hook-maintaining fastener 36 to increase or decrease the amount of friction maintaining the hooks 13 within the receiving area 12 of the retractable hooking mechanism 10. The fishing line 40 preferably extends from the front of the retractable hooking mechanism 10 from between the first plate 16 and the second plate 22 to the fisherperson. Extending the fishing line 40 from the front of the retractable hooking mechanism 10 allows the fishing lure 12 to be pulled through the water in a natural manner.

The retractable hooking mechanism 10 is then positioned within the minnow and secured therein by the anchoring device 32. The fisherperson can then cast or troll with the fishing lure 12 with the retractable hooking mechanism 10 in a normal fashion. As the fish strikes the fishing lure 12, the fisherperson feels the strike through the fishing line 40. The fisherperson, as ordinarily done, "sets the hook", by jerking the fishing line 40 in a direction generally away from the striking fish. The setting of the hooks 13 of the retractable hooking mechanism 10 causes the hooks 13 to overcome the friction between the hook-maintaining fastener 36 and the hooks 13 and move from the retracted position to the extended position. As the hooks 13 moves into the extended position, the hooks of the retractable hooking mechanism 10 is set into the fish' mouth. It should be noted that the hook-maintaining fastener can be set to deploy the hooks 13 into the extended position upon the fish striking the fishing lure 12 without the fisherperson having to set the hook 13.

It should be noted that while the retractable hooking mechanism 10 of the present invention has been shown and described as opening into the extended position in a generally downward direction, it is within the scope of the present invention to have the retractable hooking mechanism 10 open into the extended position in a generally upward direction.

The retractable hooking mechanism 10 of the present invention provides an improvement over the attempts of conventional weedless lures by offering no springs, no triggers, and no special built fishing lures. The retractable hooking mechanism 10 is a safer, non-snagging internal hooking system that is both instantly deployable and resettable for use over and over again. The hooks 13 of the retractable mechanism 10 are safely secured within the hook receiving area 28 by the hook-maintaining fastener 36 for deployment upon occurrence of a fish striking the fishing lure 12. In fact, dropping of the fishing lure 12 should maintain the retractable hooking mechanism 10 in the retracted position thereby inhibiting accidental snagging of the fisherperson by the retractable hooking mechanism 10.

In addition to the above, the retractable hooking mechanism 10 of the present invention is less dangerous to handle and reduces the risk of hook related injuries. With the hooks 13 being normally in the retracted position, there is less likelihood for tangles between the fishing tackle in the tackle box. Further, when a fish is caught with the retractable hooking mechanism 10, the hooks 13 are easier to remove from the fish be holding the whole fishing lure 12 rather than only trying to grip the small, individual hooks. In fact, the retractable hooking mechanism 10 can be adapted for use with any size lure and can be used with fresh bait in addition to artificial fishing lures.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A self-contained retractable hooking mechanism for fishing lures and the like for use in catching fish and the like during fishing activities, the retractable hooking mechanism comprising:

a first plate having a first surface and a second surface;

a second plate having a first surface and a second surface, the second plate being spaced from the first plate creating a receiving area therebetween;

a hook pivotally secured within the receiving area between the first plate and the second plate, the hook moveable from a retracted position between the first plate and the second plate to an extended position wherein at least a portion of the hook extends from between the first plate and the second plate; and a first post contactable with the hook for releasably maintaining the hook in the retracted position; and a second post contactable with the hook for inhibiting rotation of the hook in a direction opposite the extended position;

wherein upon the occurrence of a predetermined event, the hook moves to the extended position without the use of a spring mechanism.

2. The retractable hooking mechanism of claim 1 wherein the first plate and the second plate are constructed from two different plates.

3. The retractable hooking mechanism of claim 1 wherein the first plate and the second plate are constructed from a single plate folded back upon itself.

4. The retractable hooking mechanism of claim 1 and further comprising:
   at least one anchoring device formed on the first plate and the second plate.

\* \* \* \* \*